United States Patent
Chang et al.

(10) Patent No.: US 11,048,156 B2
(45) Date of Patent: Jun. 29, 2021

(54) LIGHT COMBINING MODULE

(71) Applicant: Young Optics Inc., Hsinchu (TW)

(72) Inventors: Yu-Chen Chang, Hsinchu (TW); Chi-Chui Yun, Hsinchu (TW); Yi-Hsueh Chen, Hsinchu (TW)

(73) Assignee: Young Optics Inc., Hsinchu (TW)

(*) Notice: Subject to any disclaimer, the term of this patent is extended or adjusted under 35 U.S.C. 154(b) by 0 days.

(21) Appl. No.: 16/702,572

(22) Filed: Dec. 4, 2019

(65) Prior Publication Data

US 2020/0103739 A1    Apr. 2, 2020

Related U.S. Application Data

(63) Continuation of application No. 15/729,678, filed on Oct. 11, 2017, now abandoned.

(51) Int. Cl.
*G03B 21/20* (2006.01)
*G02B 27/14* (2006.01)

(52) U.S. Cl.
CPC ....... *G03B 21/2046* (2013.01); *G02B 27/141* (2013.01); *G03B 21/204* (2013.01); *G03B 21/208* (2013.01); *G03B 21/2013* (2013.01); *G03B 21/2066* (2013.01)

(58) Field of Classification Search
CPC .............. G03B 21/204; G03B 21/2046; G03B 21/2066; G03B 21/2013; G03B 21/208; G02B 27/141
See application file for complete search history.

(56) References Cited

U.S. PATENT DOCUMENTS

| | | | | |
|---|---|---|---|---|
| 6,501,210 B1* | 12/2002 | Ueno | ................ | B23Q 1/34 310/331 |
| 2009/0141254 A1* | 6/2009 | Watabe | ................ | G03B 21/28 353/101 |
| 2012/0050690 A1* | 3/2012 | Enomoto | ................ | H04N 9/315 353/31 |
| 2012/0188518 A1* | 7/2012 | Mukouyama | ........ | G03B 21/204 353/31 |
| 2014/0355240 A1* | 12/2014 | Farchtchian | .......... | H04N 9/315 362/84 |
| 2016/0182869 A1* | 6/2016 | Fukano | ................ | H04N 9/3144 353/31 |

* cited by examiner

*Primary Examiner* — Michelle M Iacoletti
*Assistant Examiner* — Danell L Owens
(74) *Attorney, Agent, or Firm* — JCIPRNET

(57) ABSTRACT

A light combining module includes a first light source, a second light source, a first dichroic mirror, and an alignment structure. The first light source is used to output a first light. The second light source is used to output a second light. The first dichroic mirror is disposed on a transmission path of the first light and the second light, wherein the first light is incident on the second light source via the first dichroic mirror. The alignment structure adjusts the position of the second light source.

20 Claims, 9 Drawing Sheets

LIGHT COMBINING MODULE

CROSS-REFERENCE TO RELATED APPLICATION

This application is a continuation application of U.S. application Ser. No. 15/729,678, filed on Oct. 11, 2017, now pending. The entirety of the above-mentioned patent application is hereby incorporated by reference herein and made a part of this specification.

BACKGROUND OF THE INVENTION

Field of the Invention

The invention relates to a light combining module and particularly relates to a light combining module that has an alignment structure.

Description of Related Art

In conventional projection modules, a projection light is mostly generated by using a red light emitting diode (LED), a blue LED, and a green LED. The brightness of the image projected by the projection module depends on the brightness of the light output from the light source module thereof. Consequently, how to further effectively excite the green LED has become an urgent issue that needs to be addressed in this field.

SUMMARY OF THE INVENTION

The embodiments of the invention provide a light combining module that uses an alignment structure to adjust the position of a light source module, the position of a dichroic mirror, or the position of a collimating lens so as to enhance brightness performance of the light combining module. The light combining module thus provides higher brightness and good image quality applicable to a projector.

In an embodiment of the invention, a light combining module includes a first light source, a second light source, a first dichroic mirror, and an alignment structure. The first light source is used to output a first light. The second light source is used to output a second light. The first dichroic mirror is disposed on a transmission path of the first light and the second light, wherein the first light is incident on the second light source via the first dichroic mirror. The alignment structure adjusts the position of the second light source. The alignment structure includes a plurality of first elastic components and a first fastening component. The plurality of first elastic components are positioned in a first direction, and the first fastening component leans against the plurality of first elastic components, so that the second light source is moved in the first direction.

In an embodiment of the invention, a light combining module includes a first light source, a second light source, a first dichroic mirror, an alignment structure, and a heat sink. The first light source is used to output a first light. The second light source is used to output a second light. The first dichroic mirror is disposed on a transmission path of the first light and the second light, wherein the first light is incident on the second light source via the first dichroic mirror. The alignment structure adjusts the position of the second light source. The heat sink is disposed on the alignment structure, wherein the second light source is disposed on a second light source module, and the second light source module is disposed on the heat sink.

In an embodiment of the invention, a light combining module includes a first light source chip, a second light source chip, a third light source chip, a fourth light source chip, a first dichroic mirror, a second dichroic mirror, an alignment structure, and a heat sink. The first light source chip is used to output a first blue light. The second light source chip is used to output a green light. The third light source chip is used to output a second blue light. The fourth light source chip is used to output a red light. The first dichroic mirror is disposed on a transmission path of the first blue light, the second blue light, and the green light, wherein the first blue light is incident on the second light source chip via the first dichroic mirror. The second dichroic mirror is disposed on a transmission path of the red light, the second blue light, and the green light. The alignment structure is used to change a position where the first blue light is incident on the second light source chip. The heat sink is disposed on the alignment structure, and the second light source chip is disposed on the heat sink.

Based on the above, in the embodiments of the invention, since the light combining module is provided with the alignment structure, the position of the light source, the position of the dichroic mirror, or the position of the collimating lens may thus be adjusted by such design of the alignment structure so as to change the position where the light is incident on the light source module, thereby achieving better excitation efficiency. In brief, the light combining module in the embodiments of the invention may produce higher brightness and good image quality applicable to a projector.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
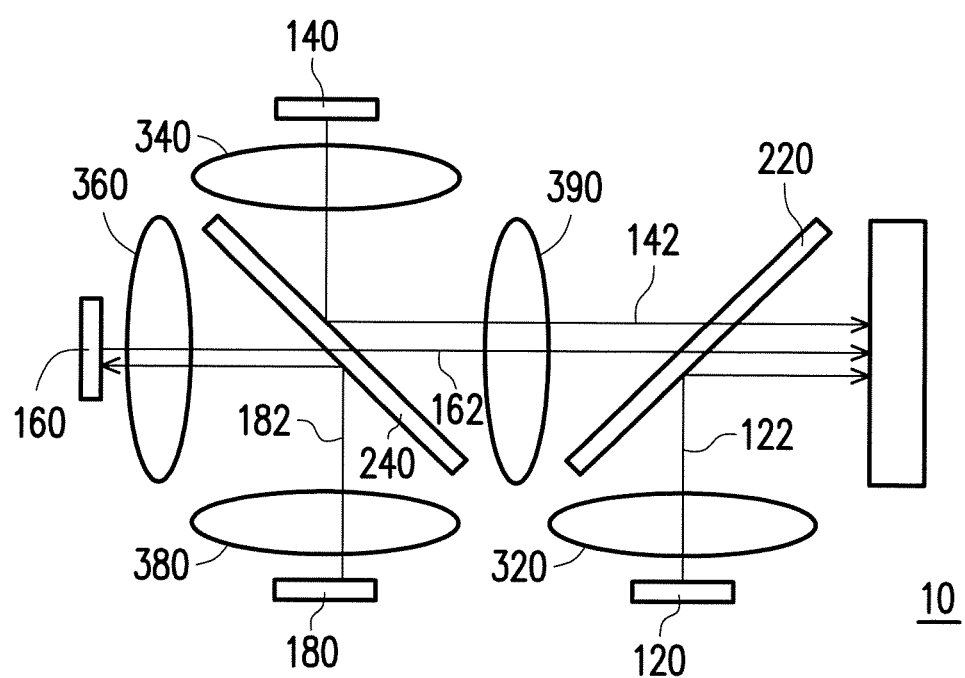
FIG. 1 is a schematic view of a light combining module according to an embodiment of the invention.
Figure 2A:
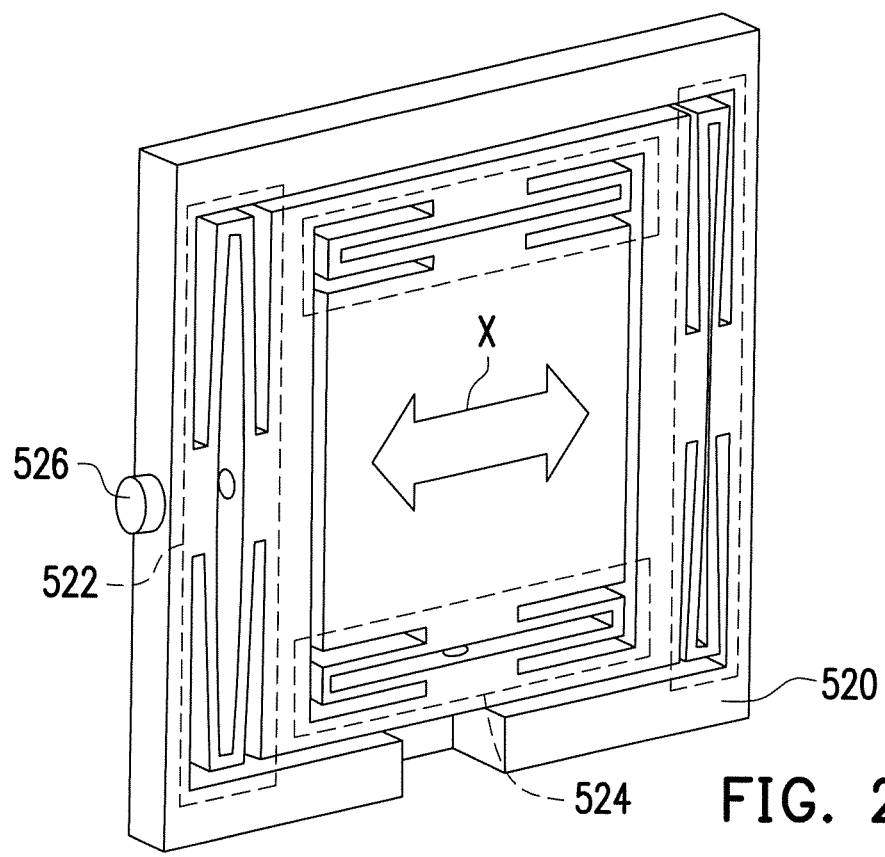
FIG. 2A is a schematic view of an alignment structure according to an embodiment of the invention.
Figure 2B:
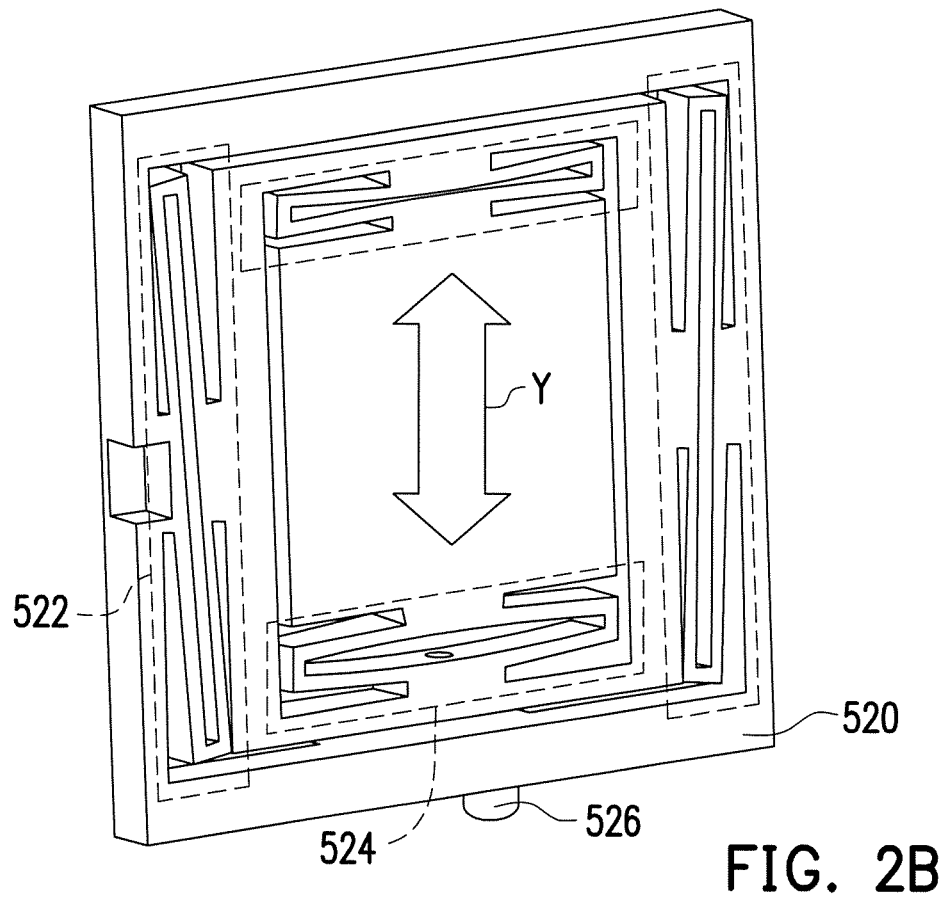
FIG. 2B is a schematic view illustrating a fastening component of the alignment structure of FIG. 2A fastened in a Y direction.
Figure 2C:
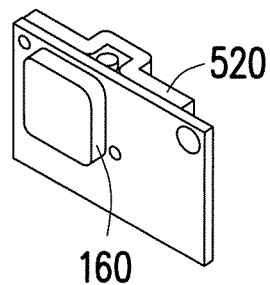
FIG. 2C is a schematic view illustrating the alignment structure of FIG. 2A assembled with the light source module of FIG. 1.
Figure 2D:
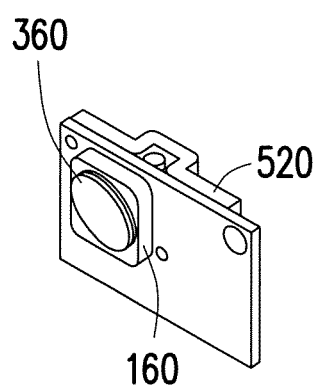
FIG. 2D is a schematic view illustrating the alignment structure of FIG. 2A assembled with the light source module and collimating lens of FIG. 1.
Figure 2E:
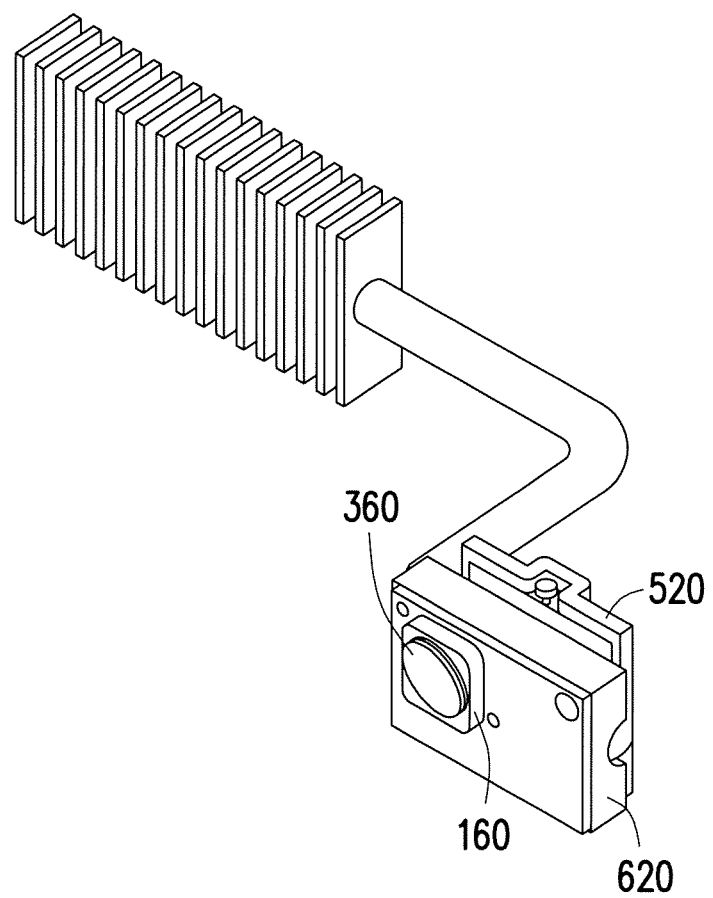
FIG. 2E is a schematic view illustrating the alignment structure of FIG. 2A assembled with a heat wink and with the light source module and collimating lens of FIG. 1.

FIG. 1 is a schematic view of a light combining module according to an embodiment of the invention. FIG. 2A is a schematic view of an alignment structure according to an embodiment of the invention. FIG. 2B is a schematic view illustrating a fastening component of the alignment structure of FIG. 2A fastened in a Y direction. FIG. 2C is a schematic view illustrating the alignment structure of FIG. 2A assembled with the light source module of FIG. 1. FIG. 2D is a schematic view illustrating the alignment structure of FIG. 2A assembled with the light source module and collimating lens of FIG. 1. FIG. 2E is a schematic view illustrating the alignment structure of FIG. 2A assembled with a heat wink and with the light source module and collimating lens of FIG. 1.

With reference to FIG. 1 and FIG. 2A simultaneously, in this embodiment, a light combining module 10 includes a plurality of light source modules 120, 140, 160, and 180, a plurality of dichroic mirrors 220 and 240, a plurality of collimating lenses 320, 340, 360, 380, and 390, and an alignment structure 520. The light combining module 10 is, for example, applied to a projector, a home theater, a rear projection screen, or a lighting fixture, and the number of the light source modules 120, 140, 160, and 180 is embodied as four, but the invention is not limited thereto. Specifically, in this embodiment, the light source module 120 is, for example, a red LED that is used to output a red light 122; the light source module 140 is, for example, a blue LED that is used to output a blue light 142; the light source module 160 is, for example, a blue LED that is covered with an excitable green fluorescent layer and is used to output a green light 162; and the light source module 180 is, for example, a blue LED that is used to output a blue light 182. Herein, the light source modules 120, 140, 160, and 180 use LEDs as light sources, but in other embodiments, a laser diode or a mercury lamp may also be used as a light source, which still falls within the protective scope of the embodiments of the invention.

As shown in FIG. 1, in this embodiment, the collimating lenses 320, 340, 360, and 380 are disposed between the light source modules 120, 140, 160, and 180 and the dichroic mirrors 220 and 240. Specifically, the collimating lens 320 is disposed between the light source module 120 and the dichroic mirror 220, and is located on a transmission path of the red light 122. The collimating lens 340 is disposed between the light source module 140 and the dichroic mirror 240, and is located on a transmission path of the blue light 142. The collimating lens 360 is disposed between the light source module 160 and the dichroic mirror 240, and is located on a transmission path of the green light 162. The collimating lens 380 is disposed between the light source module 180 and the dichroic mirror 240, and is located on a transmission path of the blue light 182. In addition, the collimating lens 390 is disposed between the dichroic mirror 220 and the dichroic mirror 240, and is located on the transmission paths of the blue light 142 and the green light 162.

Furthermore, with reference to FIG. 1 again, in this embodiment, the dichroic mirror 220 is disposed on the transmission paths of the red light 122, the blue light 142, and the green light 162, and the dichroic mirror 240 is disposed on the transmission paths of the blue light 182, the blue light 142, and the green light 162. In detail, the dichroic mirror 240 may reflect the blue light 182 to the light source module 160 so as to excite the light source module 160 to output the green light 162, and the dichroic mirror 240 may also reflect the blue light 142 to the dichroic mirror 220. The output green light 162 may pass through the dichroic mirror 240. The dichroic mirror 220 may be used to combine the red light 122, the blue light 142, and the green light 162 that is emitted by the dichroic mirror 240, so that the light combining module 10 of this embodiment may emit a white light.

In particular, in the light source module 160 that adopts the blue LED covered with the excitable green fluorescent layer as the light source, the green fluorescent layer, in addition to being excited by the blue LED underneath, may also reflect the blue light 182 output by the light source module 180 to the light source module 160 via the dichroic mirror 240, thereby exciting the green fluorescent layer and causing the light source module 160 to output a stronger green light 162. As a result, the light combining module 10 provides enhanced brightness and improved image quality applicable to a projector.

With reference to FIG. 2A, in this embodiment, the alignment structure 520 includes a plurality of first elastic components 522, a plurality of second elastic components 524, and a fastening component 526. The first elastic components 522 are positioned in a first direction X, the second elastic components 524 are positioned in a second direction Y, and the first direction X is perpendicular to the second direction Y. The fastening component 526 may lean against the first elastic components 522 to elastically deform the first elastic components 522 so that the alignment structure 520 is moved in the first direction X. Alternatively, with reference to FIG. 2B, the fastening component 526 may lean against the second elastic components 524 to elastically deform the second elastic components 524 so that the alignment structure 520 is moved in the second direction Y. In one embodiment, the first elastic components 522 and the second elastic components 524 may be springs or plate springs, for example, and the fastening component 526 may be a screw or a bolt, for example, but the embodiments of the invention are not limited thereto.

As shown in FIG. 2C, in this embodiment, the light source module 160 may be assembled with the alignment structure 520. Or, as shown in FIG. 2D, the collimating lens 360 is disposed on the light source module 160, and the light source module 160 is assembled with the alignment structure 520. Or, as shown in FIG. 2E, the light combining module 10 further includes a heat sink 620, wherein the heat sink 620 is disposed on the alignment structure 520, and the light source module 160 is disposed on the heat sink 620. Thus, the heat sink 620 is disposed between the light source module 160 and the alignment structure 520, the collimating lens 360 is disposed on the light source module 160, and the light source module 160 is disposed on the alignment structure 520. When a deviation occurs in the predetermined position where the dichroic mirror 240 reflects the blue light 182 to the light source module 160 (i.e. the blue light 182 is not projected to the predetermined position of the light source module 160), excitation efficiency loss of the light source module 160 then follows as a result. At this time, the position of the light source module 160 may be adjusted by using the alignment structure 520, such as by causing the fastening component 526 of the alignment structure 520 to lean against the first elastic components 522 to elastically deform the first elastic components 522, so that the light source module 160 is moved in the first direction X; or by causing the fastening component 526 of the alignment structure 520 to lean against the second elastic components 524 to elastically deform the second elastic components 524, so that the light source module 160 is moved in the second direction Y. Ultimately, the blue light 182 is incident on the predetermined position of the light source module 160 to ensure that the excitation efficiency loss of the light source module 160 is not too much.

Certainly, the structure/form of the alignment structure and the adjustable components of the alignment structure are not restricted by the embodiments of the invention. With reference to FIGS. 3A to 3B and FIGS. 4A to 4D, two embodiments are provided in the following to respectively illustrate different structural types of the alignment structure and the adjustable components of the alignment structure.

Figure 3A:
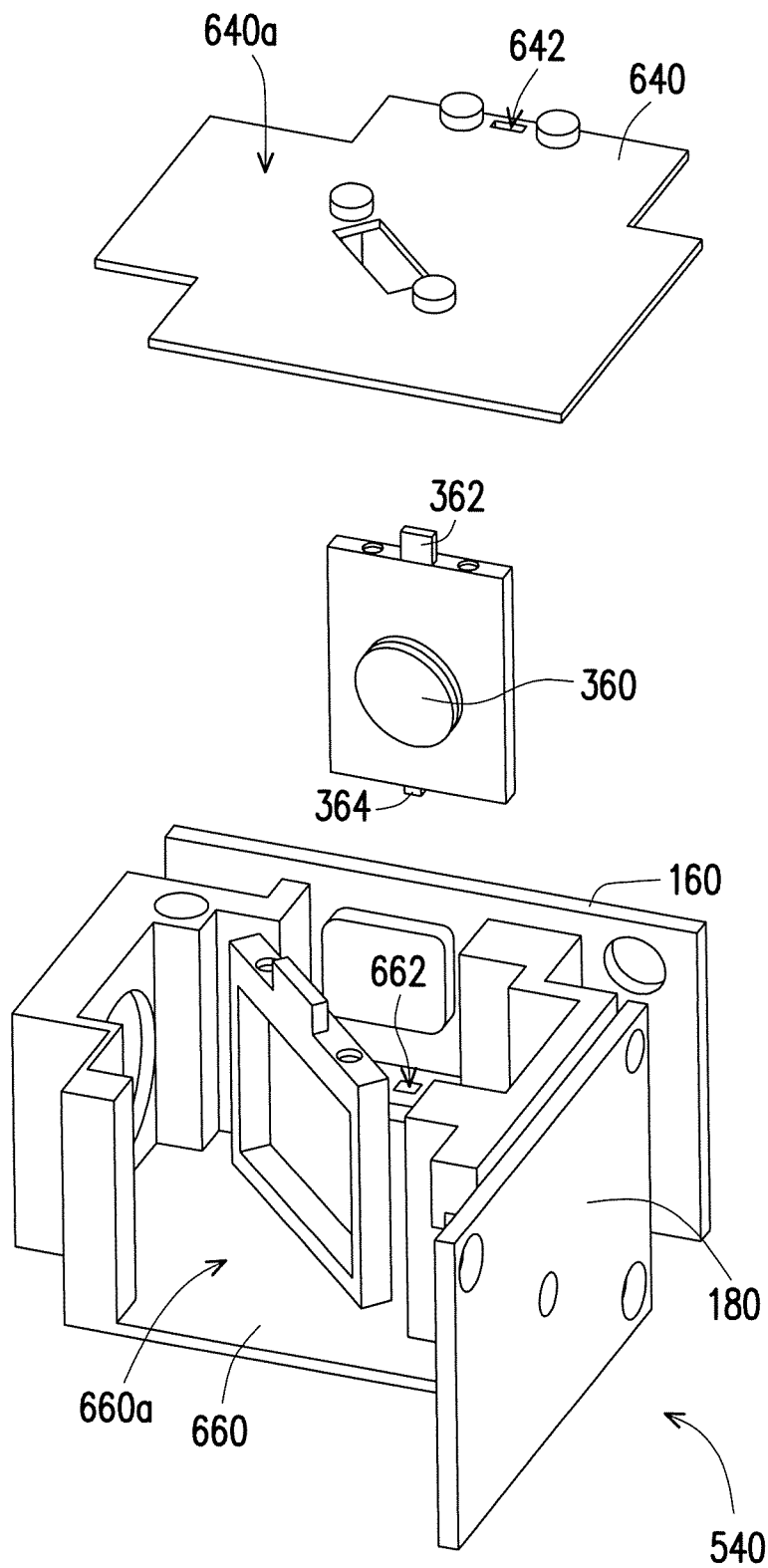
FIG. 3A is a schematic three-dimensional exploded view of an alignment structure and the dichroic mirror and collimating lens of FIG. 1 according to another embodiment of the invention.
Figure 3B:
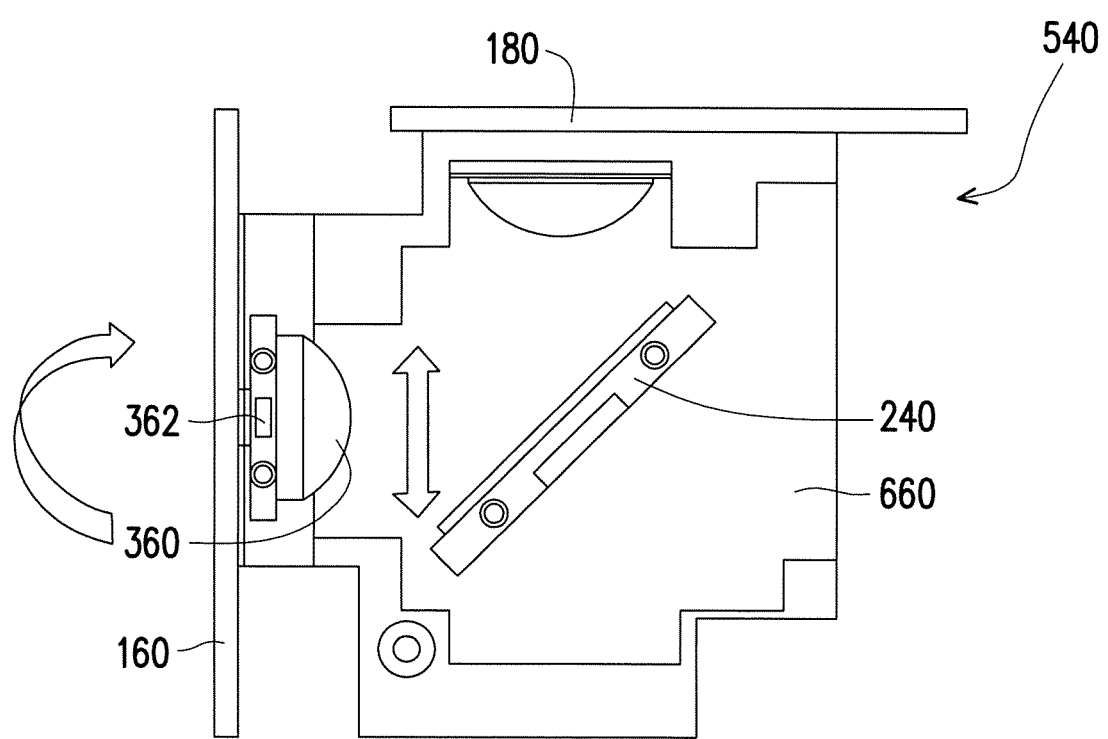
FIG. 3B is a schematic top view of FIG. 3A.

FIG. 3A is a schematic three-dimensional exploded view of an alignment structure and the dichroic mirror and collimating lens of FIG. 1 according to another embodiment of the invention. FIG. 3B is a schematic top view of FIG. 3A. With reference to FIG. 3A and FIG. 3B simultaneously, in this embodiment, an alignment structure 540 includes an upper cover 640 and a base 660. A top surface 640a of the upper cover 640 includes a position-limiting slot 642, and a bottom surface 660a of the base 660 includes a sliding slot 662. A collimating lens 360 is disposed inside the alignment structure 540, and the collimating lens 360 has a position-limiting member 362 and a locking member 364. The position-limiting member 362 protrudes above the position-limiting slot 642 of the upper cover 640, and the locking member 364 is slidably disposed inside the sliding slot 662, so that there is a relative motion between the collimating lens 360 and a light source module 160. As shown in FIG. 3B, the relative motion includes moving, rotating, or moving plus rotating.

As shown in FIG. 3B, when a deviation occurs in the predetermined position where a dichroic mirror 240 reflects a blue light 182 to the light source module 160 (i.e. the blue light 182 is not projected to the predetermined position of the light source module 160 but is, for example, projected somewhere away from the predetermined position of the light source module 160), the position of the collimating lens 360 may then be adjusted by using the alignment structure 540; for example, by applying a force to the position-limiting member 362 of the collimating lens 360 that protrudes above the position-limiting slot 642 of the upper cover 640, so that the collimating lens 360 may engage in moving, rotating, or moving plus rotating in the position-limiting slot 642 of the upper cover 640 and in the sliding slot 662 of the base 660, thereby causing a relative motion between the collimating lens 360 and the light source module 160. In this way, the blue light 182 is projected to the predetermined position of the light source module 160 to ensure that the excitation efficiency loss of the light source module 160 is not too much.

Figure 4A:
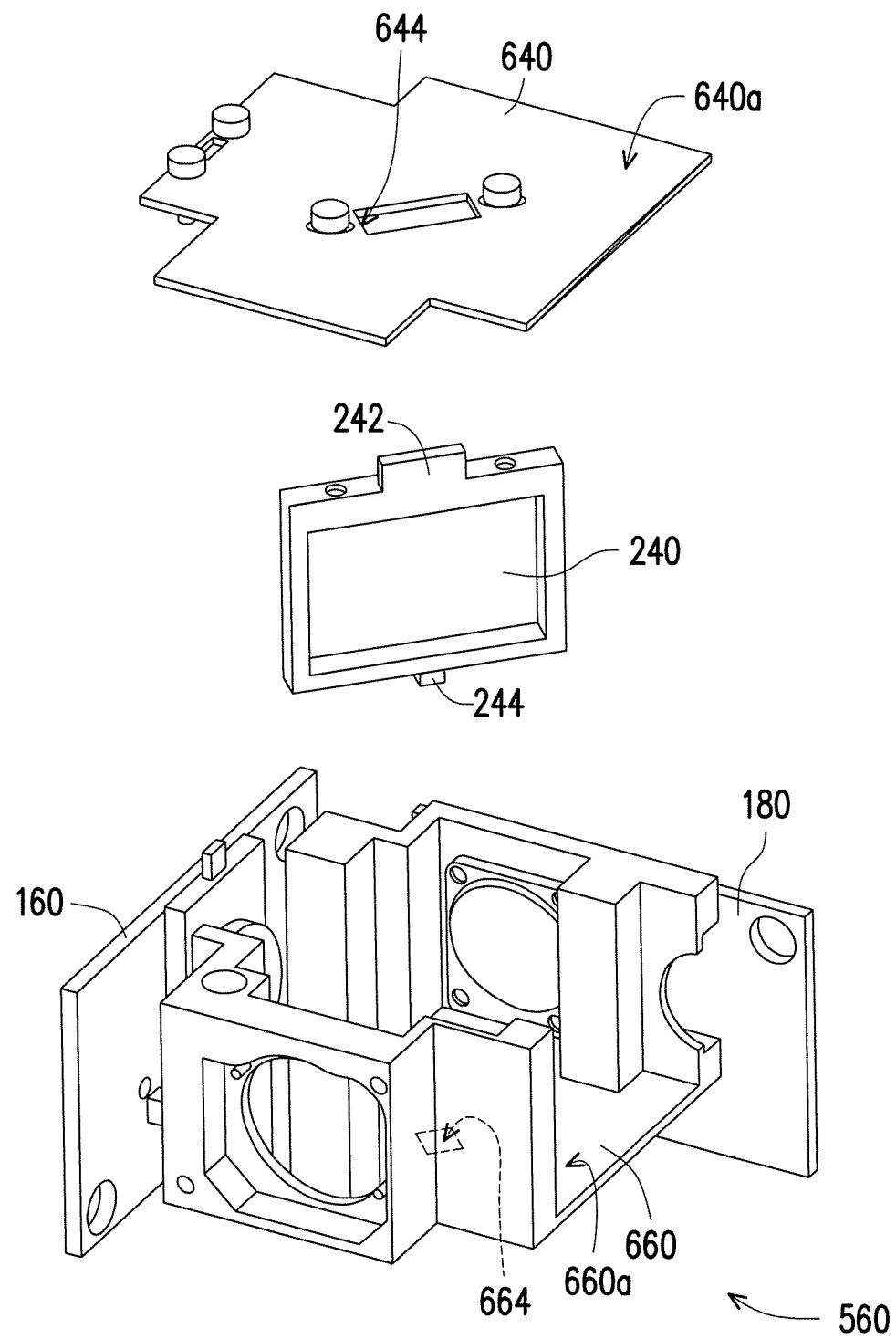
FIG. 4A is a schematic three-dimensional exploded view of an alignment structure and the dichroic mirror and collimating lens of FIG. 1 according to another embodiment of the invention.
Figure 4B:
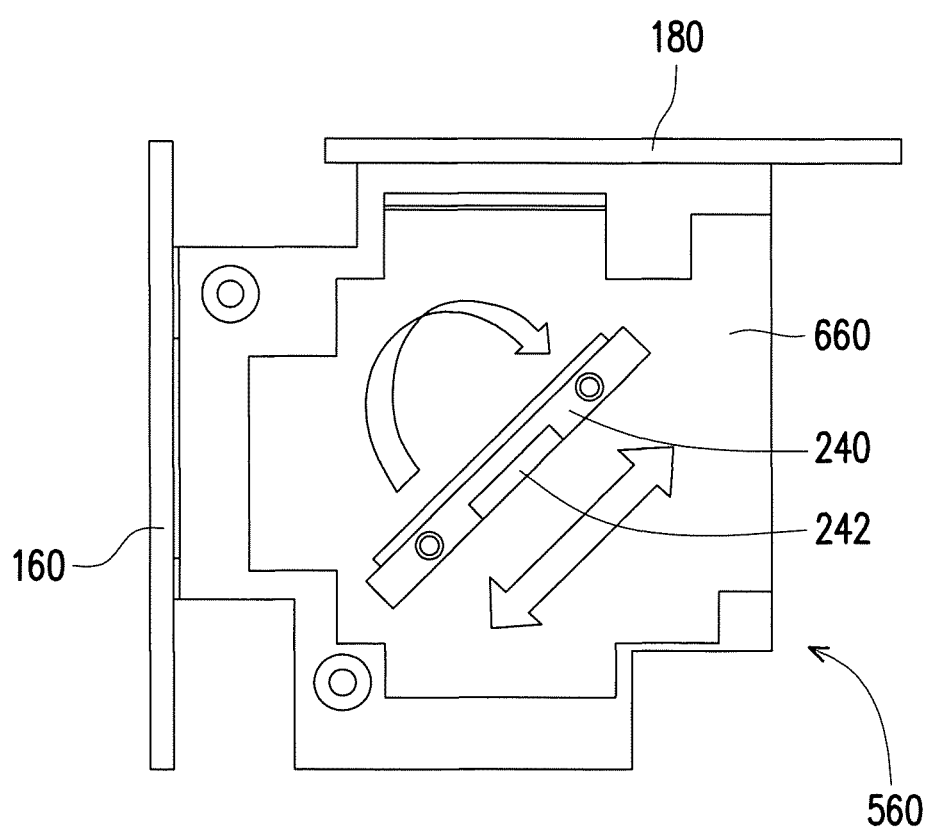
FIG. 4B is a schematic top view of FIG. 4A.
Figure 4C:
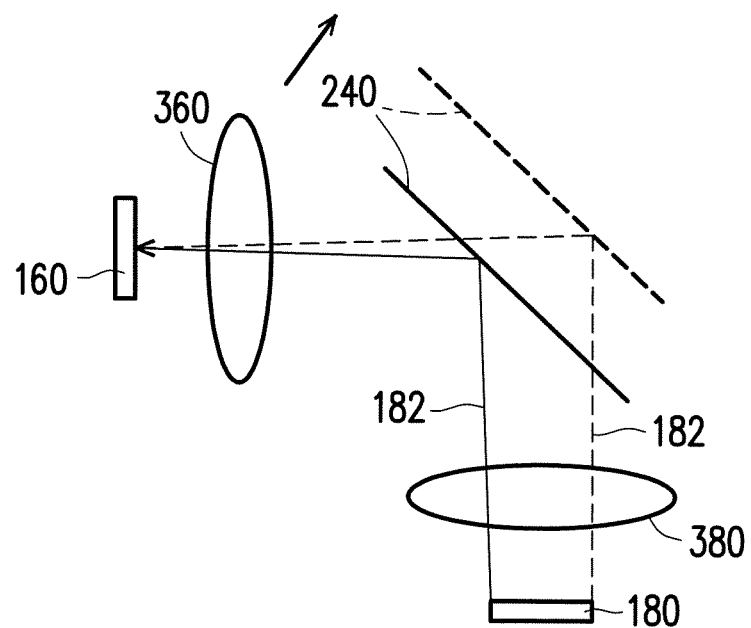
FIGS. 4C to 4D are schematic views illustrating the alignment structure of FIG. 4A adjusting the position of the dichroic mirror.
Figure 4D:
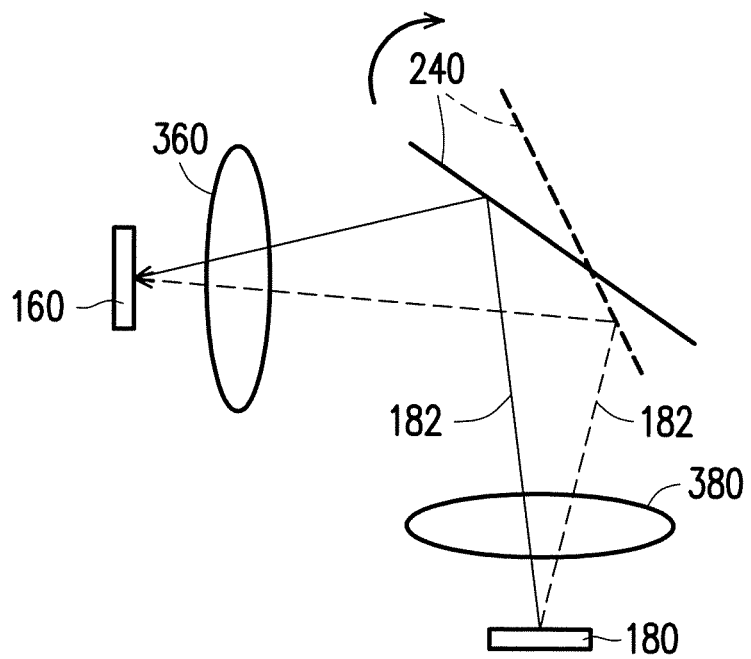

FIG. 4A is a schematic three-dimensional exploded view of an alignment structure and the dichroic mirror and collimating lens of FIG. 1 according to another embodiment of the invention. FIG. 4B is a schematic top view of FIG. 4A. FIGS. 4C to 4D are schematic views illustrating the alignment structure of FIG. 4A adjusting the position of the dichroic mirror.

With reference to FIG. 4A to 4B simultaneously, an alignment structure 560 of this embodiment is similar to the alignment structure 540 of FIGS. 3A to 3B. The main difference between the two alignment structures lies in that herein a top surface 640a of an upper cover 640 includes a position-limiting slot 644, and a bottom surface 660a of a base 660 includes a sliding slot 664. A dichroic mirror 240 is disposed inside the alignment structure 560, and the dichroic mirror 240 has a position-limiting member 242 and a locking member 244. The position-limiting member 242 protrudes above the position-limiting slot 644 of the upper cover 640, and the locking member 244 is slidably disposed inside the sliding slot 664, so that there is a relative motion between the dichroic mirror 240 and a light source module 160. Here the relative motion includes moving (please refer to FIG. 4C), rotating (please refer to FIG. 4D), or moving plus rotating (please refer to FIG. 4B).

In brief, in this embodiment, since the light combining module 10 is designed to include the alignment structure 520 (or the alignment structure 540, or the alignment structure 560), the light combining module 10, by using the alignment structure 520 (or the alignment structure 540, or the alignment structure 560), may adjust the position of the light source module 160, the position of the dichroic mirror 240, or the position of the collimating lens 360 to ensure that the predetermined position where the blue light 182 is reflected to the light source module 160 is not deviated too much, thereby achieving better excitation efficiency.

It should be noted that the light combining module 10 that is taken as an example in the foregoing embodiments includes the four light source modules 120, 140, 160, and 180, the two dichroic mirrors 220 and 240, the five collimating lenses 320, 340, 360, 380, and 390, and the one alignment structure 520 (or the alignment structure 540, or the alignment structure 560). However, in other embodiments, if the excitation efficiency of the phosphor layer of the light source module provided by the light combining module needs to be enhanced, the light combining module at least should have two light source modules, such as the light source modules 160 and 180, one dichroic mirror, such as the dichroic mirror 240, the two collimating lenses 360 and 380, and the one alignment structure 520 (or the alignment structure 540, or the alignment structure 560). In this way, the light combining module may produce effects of higher brightness and good image quality applicable to a projector, just like the light combining module as described in the embodiments of the invention.

[Tolerance Analysis]

In the following, a tolerance analysis is performed on a first type LED and a second type LED to evaluate the degree of excitation efficiency loss when a deviation occurs in the position where the blue light 182 is projected to the light source module 160. Then, since position deviation may happen simultaneously to the minor axis and the major axis of the collimating lens 360, the position deviation amount of the minor axis and the position deviation amount of the major axis are listed respectively to evaluate how the amounts affect the effective excitation area and the excitation efficiency loss, as shown in Table 1 and Table 2. Herein Table 1 shows evaluation results of the first type LED, and Table 2 shows evaluation results of the second type LED.

TABLE 1

| light position | effective excitation area | | excitation efficiency loss | |
|---|---|---|---|---|
| deviation amount (mm) | minor axis deviation | major axis deviation | minor axis deviation | major axis deviation |
| 0 | 3.90 | 3.90 | 0% | 0% |
| 0.18 | 3.43 | 3.63 | −12% | −7% |
| 0.118 | 3.59 | 3.72 | −8% | −5% |
| 0.092 | 3.66 | 3.76 | −6% | −4% |
| 0.077 | 3.70 | 3.78 | −5% | −3% |
| 0.051 | 3.77 | 3.82 | −3% | −2% |

TABLE 2

| light position | effective excitation area | | excitation efficiency loss | |
|---|---|---|---|---|
| deviation amount (mm) | minor axis deviation | major axis deviation | minor axis deviation | major axis deviation |
| 0 | 1.92 | 1.92 | 0% | 0% |
| 0.18 | 1.64 | 1.70 | −15% | −12% |
| 0.118 | 1.74 | 1.78 | −10% | −8% |
| 0.092 | 1.78 | 1.81 | −7% | −6% |
| 0.077 | 1.80 | 1.83 | −6% | −5% |
| 0.051 | 1.84 | 1.86 | −4% | −3% |

In light of the evaluation results of Table 1 and Table 2, position deviations in the different directions (i.e. the minor axis or the major axis) of the collimating lens 360 result in different excitation efficiency losses. Since the effective excitation area of the second type LED is smaller than the effective excitation area of the first type LED, the excitation efficiency loss of the second type LED is more obvious if the position deviation amounts are the same. If the position of the light source module 160, the position of the dichroic mirror 240, or the position of the collimating lens 360 is adjusted by using the alignment structure 520 (or the alignment structure 540, or the alignment structure 560) to ensure that no deviation occurs in the predetermined position where the blue light 182 is reflected to the light source module 160 (i.e. the position deviation amount is 0 mm), then the cumulative tolerance may be significantly reduced, so that the effective excitation area is increased and the problem of excitation efficiency loss is solved.

In summary, in the embodiments of the invention, since the light combining module is provided with the alignment structure, the position of the light source module, the position of the dichroic mirror, or the position of the collimating lens may then be adjusted by the design of the alignment structure so as to change the position where the dichroic mirror reflects the light to the light source module, thereby achieving better excitation efficiency. In brief, the light combining module in the embodiments of the invention may produce higher brightness and good image quality applicable to a projector.

Although the embodiments are already disclosed as above, these embodiments should not be construed as limitations on the scope of the invention. It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A light combining module, comprising:
   a first light source used to output a first light;
   a second light source used to output a second light;
   a first dichroic mirror disposed on a transmission path of the first light and the second light, wherein the first light is incident on the second light source via the first dichroic mirror; and
   an alignment structure for adjusting a position of the second light source, wherein the second light source is disposed on the alignment structure, and the alignment structure comprises a plurality of first elastic components and a first fastening component, wherein the plurality of first elastic components are positioned in a first direction, and the first fastening component leans against the plurality of first elastic components in the first direction so that the second light source is stationary and does not change position over time.

2. The light combining module as recited in claim 1, wherein the first light source comprises a blue light emitting diode and is disposed on a first light source module, and the second light source comprises a blue light emitting diode covered with an excitable green fluorescent layer and is disposed on a second light source module.

3. The light combining module as recited in claim 2, wherein the second light source module further comprises a collimating lens.

4. The light combining module as recited in claim 1, wherein the alignment structure further comprises a plurality of second elastic components and a second fastening component, the plurality of second elastic components are positioned in a second direction different from the first direction, and the second fastening component leans against the plurality of second elastic components in the second direction so that the second light source is stationary and does not change position over time.

5. A light combining module, comprising:
   a first light source used to output a first light;
   a second light source used to output a second light;
   a first dichroic mirror disposed on a transmission path of the first light and the second light, wherein the first light is incident on the second light source via the first dichroic mirror;
   an alignment structure for adjusting a position of the second light source; and
   a heat sink disposed on the alignment structure, wherein the second light source is disposed on a second light source module, the second light source module is disposed on the heat sink, and the second light source on the alignment structure is stationary and does not change position over time.

6. The light combining module as recited in claim 5, wherein the first light source comprises a blue light emitting diode and is disposed on a first light source module, and the second light source comprises a blue light emitting diode covered with an excitable green fluorescent layer and is disposed on the second light source module.

7. The light combining module as recited in claim 5, wherein the alignment structure comprises a plurality of first elastic components and a first fastening component, the plurality of first elastic components are positioned in a first direction, and the first fastening component leans against the plurality of first elastic components in the first direction so that the second light source module is stationary and does not change position over time.

8. The light combining module as recited in claim 7, wherein the alignment structure further comprises a plurality of second elastic components and a second fastening component, the plurality of second elastic components are positioned in a second direction different from the first direction, and the second fastening component leans against the plurality of second elastic components in the second direction so that the second light source module is stationary and does not change position over time.

9. A light combining module, comprising:
a first light source chip used to output a first blue light;
a second light source chip used to output a green light;
a third light source chip used to output a second blue light;
a fourth light source chip used to output a red light;
a first dichroic mirror disposed on a transmission path of the first blue light, the second blue light, and the green light, wherein the first blue light is incident on the second light chip module via the first dichroic mirror;
a second dichroic mirror disposed on a transmission path of the red light, the second blue light, and the green light;
an alignment structure used to change a position where the first blue light is incident on the second light source chip; and
a heat sink disposed on the alignment structure, wherein the second light source chip is disposed on the heat sink, and the second light source chip is stationary and does not change position over time.

10. The light combining module as recited in claim 9, wherein the light combining module further comprises a collimating lens, and the collimating lens is disposed on a transmission path of the green light.

11. The light combining module as recited in claim 10, wherein the alignment structure comprises a base, a bottom surface of the base has a sliding slot, and the first dichroic mirror or the collimating lens has a locking member slidably disposed inside the sliding slot.

12. The light combining module as recited in claim 11, wherein the alignment structure further comprises an upper cover, a top surface of the upper cover has a position-limiting slot, and the first dichroic mirror or the collimating lens has a position-limiting member that protrudes above the position-limiting slot of the upper cover.

13. The light combining module as recited in claim 9, wherein the alignment structure comprises a plurality of first elastic components and a first fastening component, the plurality of first elastic components are positioned in a first direction, and the first fastening component leans against the plurality of first elastic components in the first direction so that the second light source chip is stationary and does not change position over time.

14. The light combining module as recited in claim 13, wherein the alignment structure further comprises a plurality of second elastic components and a second fastening component, the plurality of second elastic components are positioned in a second direction different from the first direction, and the second fastening component leans against the plurality of second elastic components in the second direction so that the second light source chip is stationary and does not change position over time.

15. The light combining module as recited in claim 9, wherein each of the first light source chip and the third light source chip is a blue light emitting diode, the second light source chip is a blue light emitting diode covered with an excitable green fluorescent layer, and the fourth light source chip is a red light emitting diode.

16. The light combining module as recited in claim 15, wherein the second light source chip further comprises a collimating lens.

17. The light combining module as recited in claim 16, wherein the alignment structure comprises a base, a bottom surface of the base has a sliding slot, and the first dichroic mirror or the collimating lens has a locking member slidably disposed inside the sliding slot.

18. The light combining module as recited in claim 17, wherein the alignment structure further comprises an upper cover, a top surface of the upper cover has a position-limiting slot, and the first dichroic mirror or the collimating lens has a position-limiting member that protrudes above the position-limiting slot of the upper cover.

19. The light combining module as recited in claim 15, wherein the alignment structure comprises a plurality of first elastic components and a first fastening component, the plurality of first elastic components are positioned in a first direction, and the first fastening component leans against the plurality of first elastic components in the first direction so that the second light source chip is stationary and does not change position over time.

20. The light combining module as recited in claim 19, wherein the alignment structure further comprises a plurality of second elastic components and a second fastening component, the plurality of second elastic components are positioned in a second direction different from the first direction, and the second fastening component leans against the plurality of second elastic components in the second direction so that the second light source chip is stationary and does not change position over time.

* * * * *